: 2,746,896
Patented May 22, 1956

2,746,896

REINFORCED PLASTIC ARTICLES

Henry C. Thompson, Houston, Tex., assignor, by mesne assignments, to L-O-F Glass Fibers Company, Toledo, Ohio, a corporation of Ohio No Drawing. Application December 6, 1951,
Serial No. 260,335

8 Claims. (Cl. 154—128)

This invention relates to reinforced plastic articles and to reinforced plastic articles having a high degree of transparency and to their methods of manufacture.

The invention has particular application to structural elements, panels and the like for various structural uses, such as skylights and partitions, where considerable strength is required and where a high degree of transparency may be desired, and the following description for the purpose of the disclosure is directed toward methods of manufacture of and products suitable for such uses.

Heretofore reinforced plastic articles have been made of a resinous material, such as a thermosetting plastic, and a suitable reinforcing or filler material. Glass fibers have been used as the reinforcing material and ordinarily these glass fibers are pretreated with a suitable sizing material, such as a Werner type chromium compound, starch emulsions, acrylic emulsions, and the like. Without pretreatment of the glass fibers with a suitable sizing material to provide a better bond between the resin and the glass, the product is either very brittle or is considerably weakened in strength characteristics, weather resistance and the like.

In the past few years, translucent materials of glass reinforced plastics have been produced in flat and corrugated form and have been used for structural panels, decorative partitions and the like. When using glass fibers as the reinforcing material, reinforced plastic articles have been produced which were translucent and heretofore the maximum amount of visual light transmitted by such an article was 58 to 75% of the light striking it (air equal 100). When other reinforcing materials known to the art have been used with polyester resins the products have varied from opacity to translucency, depending upon the particular filler. Many of these articles have been referred to in the prior art as highly transparent. Actually, upon investigation, these articles have been found to be highly translucent. In addition, many of these reinforced plastic articles have considerable internal haze. The prior art indicates various attempts to reduce internal haze and increase visual light transmission in an effort to obtain a high degree of transparency, such as by providing special mechanical means to remove entrapped air in the interstices of the glass fiber, controlling the indices of refraction of the resin and glass so that they are alike. These processes are expensive, complicated, and as indicated, in many instances provide a material which is at best highly translucent.

It is, therefore, a general object of the present invention to provide a process for producing and a reinforced thermosetting plastic which is durable in use, strong and tough and which is suitable for various structural and decorative uses.

It is an object of the present invention to provide a process for and a plastic article reinforced with glass fibers which is substantially transparent; that is, an article which will not only transmit from about 15 to 25% more visual light striking it, but which has reduced internal haze and distortion to the extent that objects viewed through such articles may be distinguished at considerable distance from the article.

Yet a further object of the present invention is to provide a reinforced plastic article having reduced internal haze, that is highly transparent (as distinguished from highly translucent) and in which the physical properties of the article are at least equal to the physical properties of the translucent reinforced plastic articles of the prior art.

It is a further object of the present invention to provide a method for and a reinforced plastic article in which an improved bond between the reinforcing fibers and resin is provided without substantial mechanical working to release air or other gas entrapped within the interstices of the sheet material.

It is still a further object of the present invention to provide a method for and a reinforced plastic in which the reinforcing material is better wetted and bonded to the resin than the developments of the prior arts.

A further object of the present invention is the provision of a transparent plastic material reinforced with glass fibers in which the indices of refraction of the materials are not necessarily the same and in which no special mechanical working is necessary to obtain such a material.

Other and further objects and advantages will appear from a description of examples of the invention given for the purpose of disclosure.

In general, the reinforced plastic article of the present invention comprises a suitable resin reinforced with suitable reinforcing material to which from about 2% to 30% by weight of an alkyl ester of acrylic and/or methacrylic acid has been added.

Any suitable resinous material may be used as a binder and preferably a thermosetting plastic is utilized which may include any of the various thermosetting products, such as alkyd or polyester resins and variations of the synthetic thermosetting materials which may be made by one skilled in the art to produce a resin originally in a liquid state and finally in a hard, strong, solid mass. While thermosetting plastics are preferable, some non-thermosetting materials may be used as the binder. For example, certain resins obtained as by-products of the sugar and petroleum industries are satisfactory.

Any suitable glass reinforcing or filler material may be utilized in connection with the thermosetting plastic and as indicated above, such material may consist essentially of glass in the form of fibers, floc, mat and the like.

When using glass fibers as the reinforcing filler material, it is preferable to precoat the glass fibers with a suitable sizing material. Chromium complexes and complex compounds of the Werner type obtained by the reaction between a carboxylic acido group and a suitable chromium compound are suitable. United States Patents Nos. 2,524,803, No. 2,273,040 and No. 2,356,161 describe processes for producing chromium compounds of the Werner type.

It is noted that in using certain suitable sizing materials the resulting product is not transparent. For example, starch is suitable but the product is not transparent and may be used where high transparency is not desired or required.

Heretofore, when using glass fibers as reinforcing material, under the same conditions as the examples which follow, a reinforced plastic was obtained, the maximum amount of light which it would transmit being about 75% of the visual light striking it (air equal 100) and considerable internal haze was present. Unexpectedly, by utilizing glass fibers treated with a chromium complex and with the addition of an alkyl ester of acrylic or methacrylic acid to the resin a reinforced plastic article was produced which was substantially transparent, that is, a product which transmitted about 15% to 25% more of the visual light striking it and having reduced internal haze and distortion.

In producing reinforced plastic articles in accordance with the invention, a thermosetting plastic in plastic or liquid state is placed on a thin flexible film of a suitable material, such as cellophane (regenerated cellulose), a suitable glass filler is combined with the plastic and a second flexible film is placed on the combined plastic and filler. The glass is preferably coated with a chromium complex sizing material, and the aggregate is then transferred to an appropriately shaped mold and cured until in a solid state in well known manner. Heat or heat and pressure may be used in a wide range in the curing step, and in utilizing the product as a building or construction material, the mold may be of the corrugated type to give added strength to the finished product.

As indicated above, the products may be shaped and hardened in a manner well known to the art and for producing structural elements the use of corrugated molds or presses and heating in a temperature range from about room temperature to about 350° F. for a period of about one minute or less to about three hours is satisfactory. If desired, pressures may be utilized during the heating and curing stage and pressures from contact pressure up to and exceeding approximately 250 p. s. i. may be used.

If desired, various catalysts may be used in connection with the thermosetting plastic to aid in forming a hard, strong, solid mass and organic peroxide catalysts, such as benzoyl peroxide, tertiary butyl perbenzoate, methyl-ethylketone peroxide and the like are satisfactory for the purpose. If desired, various promoters and accelerators known to the art, such as the mercaptans, may be used.

If desired, the products may be tinted with dyes or pigments and various proportions of materials may be used. For example, the concentration of catalysts may vary from about 0.1% to about 3.0% or more by weight and the concentration of the accelerator or promoter may vary from about 0.001% to about 3.0% by weight. The percentage of filler will vary greatly; for example, from about 1% in the case of glass floc to about 40% by weight in the case of glass mat or cloth. In using glass mat as the reinforcing material, the glass fiber content will usually vary from about 15% to 40% by weight.

Satisfactory results and improvements have been obtained in adding from about 2% to about 30% by weight of an alkyl ester of acrylic or methacrylic acid, the preferred range being from about 7% to about 12% by weight of the resin employed.

As indicated heretofore, preferably the reinforcing material is coated with a sizing compound, or an intermediate linkage group, and these may be of any type known to the art. Chromium complexes or compounds, however, are particularly effective in using glass fibers, as indicated.

In order that a better understanding of the invention may be had, the following examples are given. It will be understood, of course, that the following specific examples are illustrative only of the principles of the invention and that the invention is not limited to the precise conditions and materials indicated.

Example I

In this example a reinforced plastic article suitable for structural purposes was made by utilizing glass mat consisting of random fibers (known as "150" diameter in the art) and weighing approximately 2 oz. per sq. foot as a reinforcing material. This glass mat had been previously coated with a sizing material consisting of a chrome complex. The glass mat coated with such a sizing material may be conventionally purchased on the market, and one such product is the Owens-Corning Fiberglas T-36. The coated glass mat was impregnated by enrolling it into a pool of catalyzed resin. The resin used in this example was a commercial product sold under the name of Laminac by American Cyanamid Company, which is a polyester resin, to which had been added 9% methyl methacrylate monomer. The resin was catalyzed with one-half percent benzoyl peroxide and one-half percent methyl-ethyl ketone peroxide. In making up the aggregate, the liquid or plastic polyester resin containing 9% methyl methacrylate was placed upon a sheet of cellulose and the coated glass mat placed thereon. A second sheet of cellophane was placed on top. The impregnated mat or aggregate was then placed between a corrugated metal mold and heat was applied in order to cure the core stock. The temperature was raised from approximately 85° to 250° over a period of about 30 minutes during which a light pressure of one-half pound per square foot was applied. After the corrugated plastic was cured, it was removed from the mold and the cellophane was stripped therefrom.

The corrugated product produced transmitted approximately 80 to 85% of the visual light striking it (air equal 100), and had substantially reduced internal haze. In using cellophane on either side, however, optical transparency is not obtained. The same product made under the same conditions in which flat polished glass plates were substituted for the cellophane and a flat article was produced, passed 85 to 90% of the visual light striking it, internal haze was virtually eliminated and the viewer could distinguish objects therethrough several miles away. These articles were tough, shatter resistant, and of strength at least equal in comparison with a reinforced plastic made under identical conditions in which the 9% of methyl methacrylate was not added. The product resulting from the latter test transmitted only 64 to 70% for the corrugated and 70 to 75% for the flat product of the visual light striking it, had considerable internal haze and it was impossible to distinguish objects therethrough more than a few inches to a few feet from the product.

In making the light transmission tests, a photoelectric cell was placed three feet from a light source. The arrangement was calibrated so that a reading of 100 was obtained with only air between the light source and the photoelectric cell. Various articles were placed a fixed distance between the light source and the photoelectric cell and readings were made. For example, a sheet of plate glass gave readings from about 90 to 95. The photoelectric cell used was a commercial type which absorbs and indicates the same rays seen by the human eye.

It is interesting to note that when methyl methacrylate was added to the polyester resin used to impregnate the glass mat, the glass fibers remained fairly visible even after curing and while hot. Upon cooling, the glass fibers disappeared to an extent sufficient that the high transparency was obtained. Under identical conditions, when methyl methacrylate was omitted, before curing, the glass virtually disappeared in the resin to create a nearly transparent sheet. Upon removing this sheet from the mold after curing and while the temperature thereof was still relatively high (about 225°–275° F.), the sheets were relatively transparent, but upon cooling, the glass fibers reappeared in varying degree ranging from transparency to opacity. While the results are not fully understood and there is no desire to be bound by any theory, it would appear that the transparency may be obtained by one or more of the following factors: (1) the elimination of an interfacial void between the resin and the glass, (2) better control of the shrinkage of the resin around the glass fiber, (3) chemical solution of the sizing by the resin or chemical combination of the resin and the film of sizing which was applied to the commercial glass fibers, and (4) better physical wetting of the glass fiber and/or its film by the resin containing methyl methacrylate due to changes such as change in surface tension, polarity and the like. In connection with (3), it may be that the chemical combination of resin and sizing or resin and glass fibers direct is promoted by the addition of compounds such as methyl methacrylate or other compounds which will provide an intermediate linkage group between resin and size or between resin and glass. For example, it has been noted that the addition of vinyl toluene, which contains an active double bond linkage group also promotes transparency and improved light transmission in some cases. Either one or all of the factors and others may play an important part in producing the substantially transparent product, but the result is a glass reinforced plastic article in which the reflective surfaces at the glass fiber interfaces are substantially eliminated although the component elements obviously have different indices of refraction. Thus, the reflective surfaces or interfaces which seem to exist when ordinary polyester resins come in contact with glass fiber and/or its sizing film are reduced and a reduction is obtained in the reflection and/or refraction and diffusion of the light striking the interfaces. In addition, more light is transmitted and the parallelism of the light rays is maintained to a greater extent by reducing the uneven refraction of the light rays relative to each other.

Thus, as indicated, a reinforced plastic article having a high degree of transparency, and greatly reduced internal haze in which glass fiber is used as a reinforcing material was produced by the above example, which article was extremely rugged, shatter resistant, strong and tough and satisfactory for use in the building and construction industry.

*Example 2*

By way of further example, a product suitable for use in the building industry was made by using a thermosetting resin and a cement to impregnate glass fibers.

Specifically, 40% Portland cement, 9% methyl methacrylate, 1% benzoyl peroxide and 50% polyester resin (Laminac) by weight, were mixed to a viscous mixture and a portion was poured on a polished glass surface. Glass mat pretreated with chromium complex sizing material was placed on the mixture, additional mixture was poured on the mat and a polished glass plate was placed on top and the whole was cured at 200° F. for 12 minutes under contact pressure. The resulting product was extremely tough and hard and had a smooth and shiny surface.

In connection with Example 2, the cement may vary from about 20% to 60 or 70% by weight, the limiting factor being the bulk of the cement making the mixture so heavy and viscous that the resin cement mixture must be forced into the glass by mechanical means. Also, satisfactory results have been obtained using from about 2 to 30% of the acrylate, 7% to 12% being preferred, and at present, best results being obtained by using 9% methyl methacrylate. It is noted that methyl-ethyl ketone peroxide is unnecessary in using cement as the mixture appears to heat itself rapidly and a chemical action between cement and resin may take place. Also, when the methyl methacrylate was omitted a product was made which was not nearly so tough and which was more brittle.

Thus, a product useful for construction purposes was produced by the method of Example 2.

While certain specific alkyl esters of acrylic or methacrylic acid have been indicated as operable, others may be used, such as methyl acrylate, butyl acrylate, octyl acrylate and mixtures thereof, including mixture with methyl methacrylate. At present, however, methyl methacrylate is preferred.

Thus, it is apparent that processes of producing reinforced plastic articles in accordance with the invention are quite flexible and may be varied considerably, depending upon the desired characteristics of the finished article. Moreover, a reinforced plastic article suitable for a variety of uses is produced by the process.

It is to be understood that the foregoing detailed description is given merely by way of illustration and that many variations may be made therein without departing from the spirit of the invention.

Having described the invention, what is claimed and desired to be secured by Letters Patent is:

1. A method of producing highly translucent reinforced plastic articles comprising, incorporating glass fibers coated with a chromium compound of the Werner type in polyester resin containing from about 2% to about 30% by weight of a compound selected from the group consisting of alkyl esters of acrylic and methacrylic acid, and thereafter curing said resin having said coated glass fibers intimately incorporated therein.

2. A method of producing highly translucent reinforced plastic articles comprising, adding from about 2% to about 30% of a compound selected from the group consisting of alkyl esters of acrylic and methacrylic acid to a polyester resin, intimately incorporating in said resin glass fibers coated with a chromium compound of the Werner type, and thereafter curing the resin containing the first-mentioned compound and the coated glass fibers.

3. A method of producing highly translucent reinforced plastic articles comprising the step of curing a polyester resin containing from about 2% to about 30% by weight of a compound selected from the group consisting of alkyl esters of acrylic and methacrylic acid reinforced with glass fibers coated with a chromium compound of the Werner type which forms an intermediate link between the glass fibers and the resin on curing.

4. A method of producing highly translucent reinforced plastic articles comprising the step of curing a polyester resin containing from about 2% to about 30% by weight of a compound selected from the group consisting of alkyl esters of acrylic and methacrylic acid reinforced with glass fibers coated with a size containing a chemically reactive group within the size which reacts with the polyester resin on curing to form an intermediate link between the glass fibers and the resin.

5. A highly translucent bonded plastic article comprising, polyester resin containing from about 2% to about 30% by weight of a compound selected from the group consisting of alkyl esters of acrylic and methacrylic acid, glass fibers embedded in and linked to said polyester resin by a chromium compound of the Werner type, and characterized by transmission of above about 75% of the visual light striking it and reduced internal haze.

6. A highly translucent bonded plastic article comprising, a polyester resin containing from about 2% to about 30% by weight of a compound selected from the group consisting of alkyl esters of acrylic and methacrylic acid, glass fibers embedded in and linked to said polyester resin by a size containing a chemically reactive group within the size which reacts with the polyester resin, and characterized by a high degree of transmission of the visual light striking it and reduced internal haze.

7. The method of claim 1 where from about 7% to about 12% of the compound selected is added to the polyester resin.

8. The method of claim 1 where about 9% of the compound selected is added to the polyester resin.

References Cited in the file of this patent

UNITED STATES PATENTS

| | | |
|---|---|---|
| 1,991,007 | Bonney et al. | Feb. 12, 1935 |
| 2,255,313 | Ellis | Sept. 9, 1941 |
| 2,311,613 | Slayter | Feb. 16, 1943 |
| 2,496,911 | Green | Feb. 7, 1950 |
| 2,526,945 | Gray | Oct. 24, 1950 |

(Other references on following page)

UNITED STATES PATENTS

| | | |
|---|---|---|
| 2,528,168 | Paulson | Oct. 31, 1950 |
| 2,537,520 | Eger | Jan. 9, 1951 |
| 2,544,667 | Goebel et al. | Mar. 13, 1951 |
| 2,564,695 | Johnson et al. | Aug. 21, 1951 |
| 2,611,718 | Steinman | Sept. 23, 1952 |
| 2,632,752 | Anderson | Mar. 24, 1953 |

OTHER REFERENCES

Modern Plastics, April 1951, page 87, Corrugated Translucent Panels.

"Corrulux," Circular A. I. A. File Number 26–A–9, attached price sheet, dated September 1, 1950.